United States Patent
Lee et al.

(10) Patent No.: US 6,909,599 B2
(45) Date of Patent: *Jun. 21, 2005

(54) VIBRATION TOLERANT ELECTRONIC ASSEMBLY AND RELATED METHODS

(75) Inventors: Ying-Ming Lee, Melbourne, FL (US); Frank Daneshgar, Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/609,968

(22) Filed: Jun. 30, 2003

(65) Prior Publication Data

US 2004/0090741 A1 May 13, 2004

Related U.S. Application Data

(63) Continuation of application No. 09/949,289, filed on Sep. 7, 2001, now Pat. No. 6,621,694.

(51) Int. Cl.[7] .................................................. G06F 1/16
(52) U.S. Cl. .................... 361/685; 361/679; 361/683
(58) Field of Search ......................... 361/679, 683–686

(56) References Cited

U.S. PATENT DOCUMENTS

| | | | |
|---|---|---|---|
| 4,351,556 A | 9/1982 | Worringer | 296/63 |
| 4,749,164 A | 6/1988 | Leo et al. | 248/674 |
| 4,893,210 A | 1/1990 | Mintzlaff | 360/137 |
| 4,908,715 A | 3/1990 | Krum et al. | 360/97.02 |
| 5,035,396 A | 7/1991 | Krum et al. | 248/635 |
| 5,463,527 A | 10/1995 | Hager et al. | 361/685 |
| 5,602,717 A | 2/1997 | Leshem et al. | 361/685 |
| 5,982,573 A | 11/1999 | Henze | 360/75 |
| 6,097,608 A | 8/2000 | Berberich et al. | 361/752 |
| 6,220,563 B1 | 4/2001 | Cunningham | 248/580 |
| 6,445,587 B1 | 9/2002 | Pavol | 361/727 |
| 6,477,042 B1 | 11/2002 | Allgeyer et al. | 361/685 |

*Primary Examiner*—Yean-Hsi Chang
(74) *Attorney, Agent, or Firm*—Allen, Dyer, Doppelt, Milbrath & Gilchrist, P.A.

(57) ABSTRACT

A vibration tolerant electronic assembly may include a base and a first isolation stage including a first frame, at least one first linear bearing coupling the first frame to the base to constrain movement of the first frame along a first coordinate axis, and at least one first damper for damping movement of the first frame. A second similar isolation stage may be coupled to the first isolation stage, and a third similar isolation stage may be coupled to the second isolation stage. Furthermore, an electronic device may be coupled to the third isolation stage. The electronic assembly provides resistance to disturbance of the electronic device by vibration in one or more of three coordinate axis.

14 Claims, 4 Drawing Sheets

VIBRATION TOLERANT ELECTRONIC ASSEMBLY AND RELATED METHODS

This application is a continuation of Ser. No. 09/949,289 filed on Sep. 7, 2001 now U.S. Pat. No. 6,621,694.

FIELD OF THE INVENTION

The present invention relates to the field of electronic devices, and more particularly, to assemblies and methods for reducing vibration thereof.

BACKGROUND OF THE INVENTION

Computers have become commonplace in a great number of applications. Depending upon the data storage and retrieval requirements of a particular application, a computer will typically be configured with a certain combination of memory devices. This is because each particular memory device has particular advantages and disadvantages in terms of cost, speed, and storage capacity.

For example, memory such as cache memory has very fast read and write times, but it is typically one of the most costly types of memories and is often impractical to use on a large scale. On the other hand, writeable disk drives, such as magnetic hard disk drives or optical drives, are much less costly and provide a very large storage capacity, but generally have slower data transfer rates. Additionally, hard disk drives can store data indefinitely even after power is no longer supplied. In between cache memory and disk drives is solid state memory, which is not as fast as cache memory but is less expensive. Further, solid state memory is faster than hard disk drives but still significantly more expensive. Thus, solid state memory is simply not yet practical for very large storage requirements where several Gigabytes or even Terabytes of memory are needed.

Yet, to read or write data to a hard disk drive or optical drive, for example, a read/write head has to be aligned with the disk while it is moving to correctly transfer data to and from the disk. As a result, disk drives typically are susceptible to read and write errors caused by movement or vibration. That is, the read/write head may be jarred out of alignment with the spinning disk causing data transfer errors to occur. Even worse, such vibrations may cause damage to the moving components of the disk drive. This is because disk drives are typically quite sensitive to rotational motion and high G forces at high frequencies. While semiconductor memories such as solid state memories generally are not prone to such vibration damage, as noted above, because of cost it may not be economically feasible to use such memories in high stress environments where movement or vibration is likely if large data storage capacities are required.

As a result, attempts have been made to reduce the effects of shock and vibration on disk drives so that they will be less prone to errors or damage from movement or vibrations. One prior art example is disclosed in U.S. Pat. No. 6,097,608 to Berberich et al. entitled "Disk Drive Vibration Isolation Using Diaphragm Isolators." The patent discloses a diaphragm isolator frame for supporting a disk drive in a rack or other enclosure while providing isolation from undesirable vibrations from other disk drives, components mounted in the enclosure, or from the environment. The diaphragm isolator frame includes a pair of side rails having diaphragm isolators formed of thinned portions of the side rails. Each diaphragm has a centrally located press-pin for supporting the disk drive. Further, the thickness and diameter of the diaphragms may be chosen to provide vibration isolation at a desired frequency.

While such prior art devices may provide some vibration isolation, they still may not be suitable for high stress environments where large amounts of movement or vibration are commonplace, such as in certain mobile applications. For example, computers aboard planes, ground vehicles, etc. may be subject to rather violent shaking that may cause a disk drive mounted according to the prior art to fail or be damaged during writing and/or reading operations. Nonetheless, with the ever increasing advancements in technology, computers with ever higher memory storage capacities are needed that can accommodate such data intensive technologies as well as the rigors of high stress environments.

SUMMARY OF THE INVENTION

In view of the foregoing background, it is therefore an object of the present invention to provide a vibration tolerant electronic assembly and related methods.

This and other objects, features, and advantages in accordance with the present invention are provided by a vibration tolerant electronic assembly including a base and a first isolation stage including a first frame, at least one first linear bearing coupling the first frame to the base to constrain movement of the first frame along a first coordinate axis, and at least one first damper for damping movement of the first frame along the first coordinate axis. Additionally, the vibration tolerant electronic assembly may include a second isolation stage including a second frame, at least one second linear bearing coupling the second frame to the first frame to constrain movement of the second frame along a second coordinate axis, and at least one second damper for damping movement of the second frame along the second coordinate axis. Furthermore, a third isolation stage may include a third frame, at least one third linear bearing coupling the third frame to the second frame to constrain movement of the third frame along a third coordinate axis, and at least one third damper for damping movement of the third frame along the third coordinate axis. The vibration tolerant electronic assembly may also include an electronic device coupled to the third frame.

More particularly, the at least one first damper, the at least one second damper, and the at least one third damper may each include at least one spring and/or at least one friction surface. The vibration tolerant electronic assembly may further include at least one first elastomeric coupler coupling the first and second frames together, and at least one second elastomeric coupler coupling the second and third frames together. At least one elastomeric coupler may also be included for coupling the electronic device to the third frame. The at least one first linear bearing, the at least one second linear bearing, and the at least one third linear bearing may each include a pair of parallel spaced apart linear bearings, for example.

Further, the electronic device may be a magnetic disk data storage drive, for example. Additionally, the vibration tolerant electronic assembly may further include a holder carried by the third frame upon which the electronic device is mounted, and a cover coupled to the holder for hermetically sealing the electronic device. The first frame, the second frame, and the third frame each may include metal, for example, and the first isolation stage, the second isolation stage, and the third isolation stage may have different resonant frequencies.

Another aspect of the invention relates to a vibration reduction system for an electronic device which may include a base and a first isolation stage including a first frame, at least one first linear bearing coupling the first frame to the base to constrain movement of the first frame along a first coordinate axis, and at least one first damper for damping movement of the first frame along the first coordinate axis. The vibration reduction system may also include a second isolation stage including a second frame, at least one second linear bearing coupling the second frame to the first frame to constrain movement of the second frame along a second coordinate axis, and at least one second damper for damping movement of the second frame along the second coordinate axis. Further, a third isolation stage may be included to be coupled to the electronic device. The third isolation stage may include a third frame, at least one third linear bearing coupling the third frame to the second frame to constrain movement of the third frame along a third coordinate axis, and at least one third damper for damping movement of the third frame along the third coordinate axis.

Considered in other terms, the vibration reduction system may include a plurality of isolation stages coupled to one another, where at least one isolation stage includes a frame and at least one linear bearing coupling the at least one isolation stage to an adjacent isolation stage to constrain movement of the frame along a coordinate axis. The at least one isolation stage may further include at least one damper for damping movement of the frame along the coordinate axis.

A method aspect of the invention is for reducing vibration of an electronic device and may include coupling a first frame to a base with at least one first linear bearing to constrain movement of the first frame along a first coordinate axis and damping movement of the first frame along the first coordinate axis with at least one first damper. The method may further include coupling a second frame to the first frame with at least one second linear bearing to constrain movement of the second frame along a second coordinate axis and damping movement of the second frame along the second coordinate axis with at least one second damper. Furthermore, a third frame may be coupled to the second frame with at least one third linear bearing to constrain movement of the third frame along a third coordinate axis, and movement of the third frame may be dampened along the third coordinate axis with at least one third damper. Additionally, the electronic device may be coupled to the third frame.

Considered in other terms, the method aspect may include coupling a plurality of isolation stages to one another, where at least one isolation stage includes a frame and at least one linear bearing for coupling the at least one isolation stage to an adjacent isolation stage and constraining movement of the frame along a coordinate axis. The method may also include damping movement of the frame along the coordinate axis using at least one damper.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
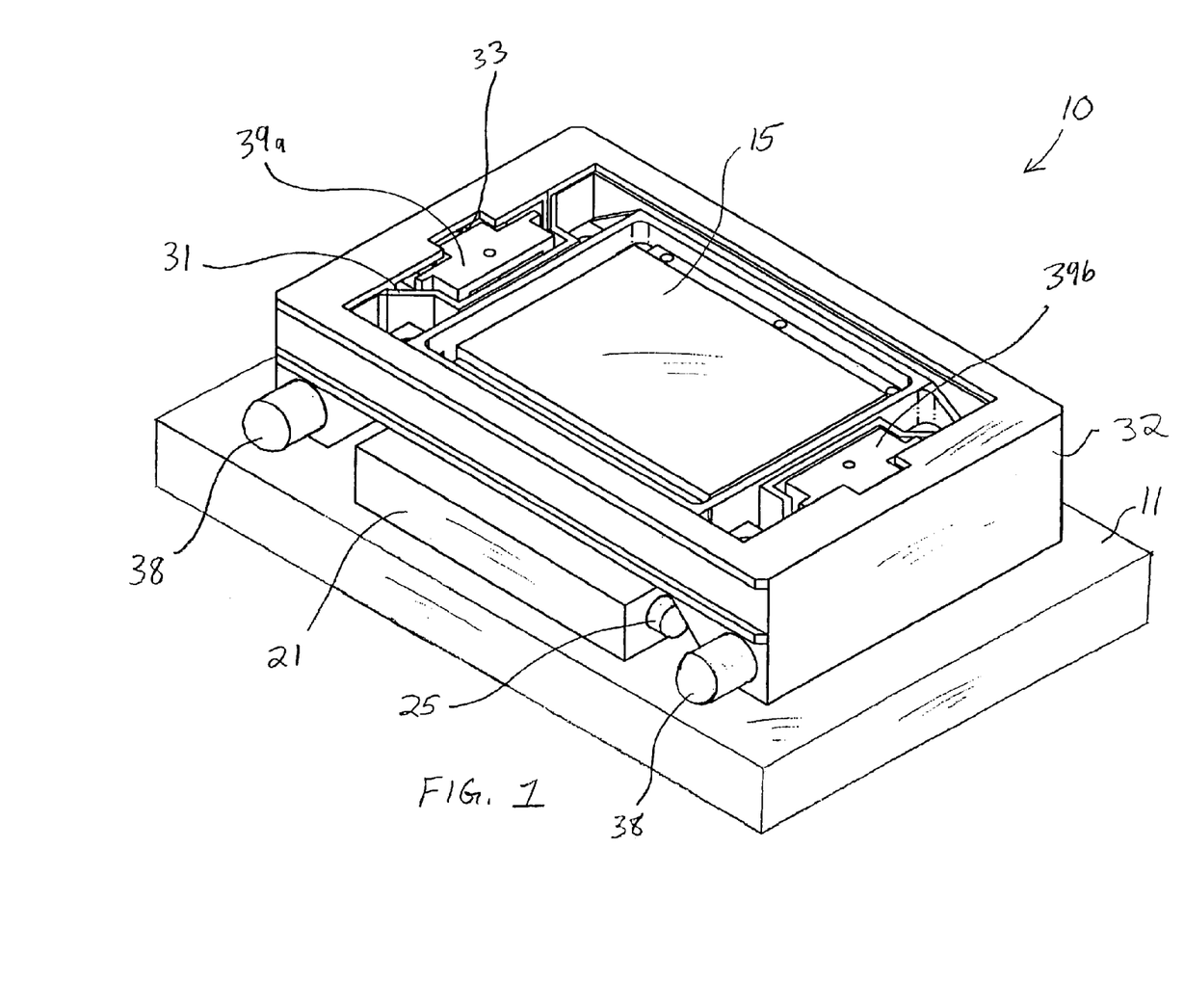
FIG. 1 is perspective view of a vibration tolerant electronic assembly according to the present invention.
Figure 2:
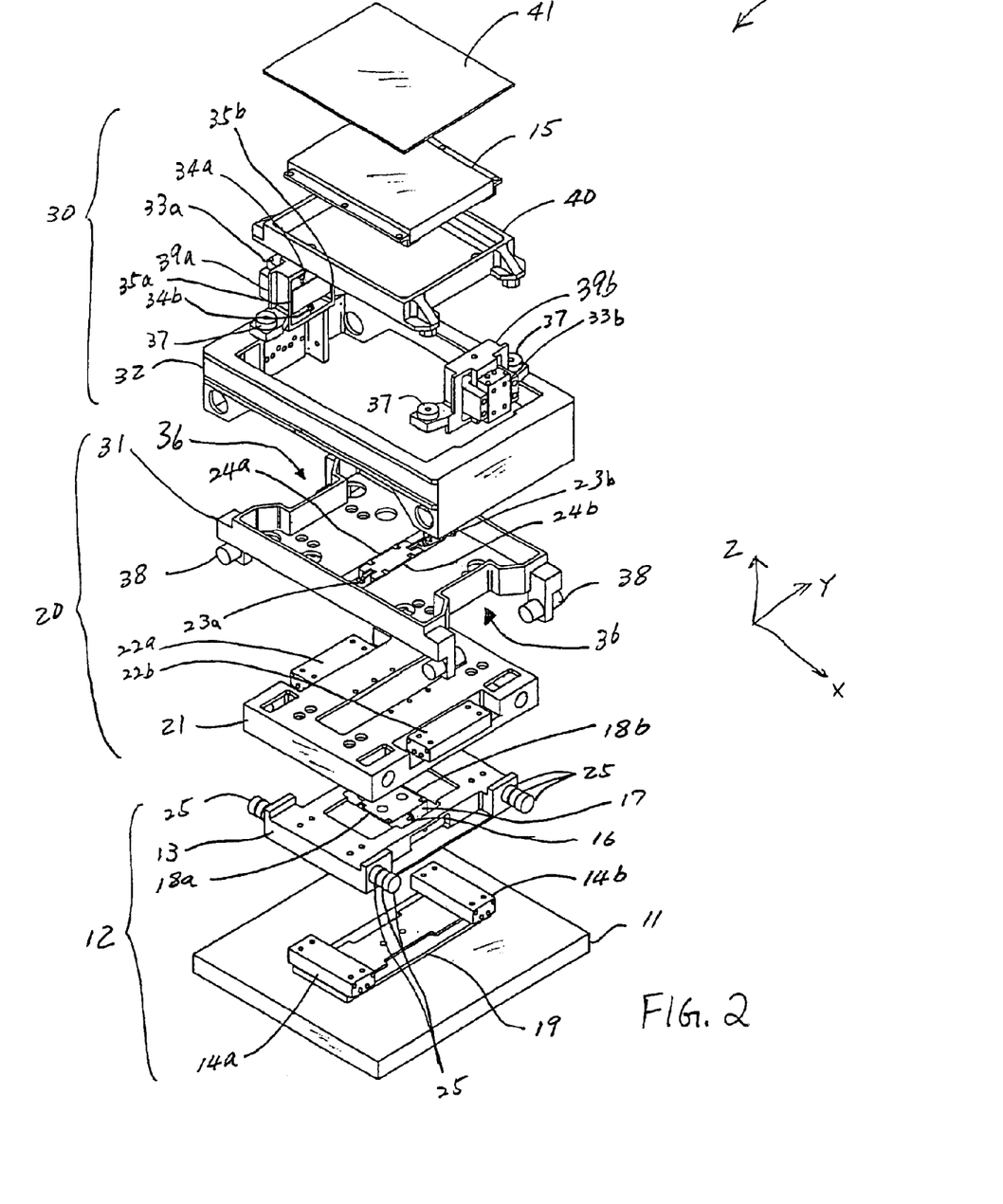
FIG. 2 is an exploded view of the vibration tolerant electronic assembly of FIG. 1.

Turning now to FIGS. 1 and 2, a vibration tolerant electronic assembly 10 according to the present invention illustratively includes a base 11 and a first isolation stage 12. The first isolation stage 12 includes a first frame 13, which may include metal or other suitable materials such as a rigid plastic, for example. Additionally, the first isolation stage 12 also includes at least one first linear bearing 14 (e.g., liner ball bearings) coupling the first frame 13 to the base 11 via a mounting plate 19. Of course, the mounting plate 19 may be omitted in certain embodiments. A pair of parallel spaced apart first linear bearings 14a, 14b are used in the illustrated embodiment, though other numbers of linear bearings may be used in accordance with the present invention.

The linear bearings 14a, 14b constrain movement of the first frame 13 along a first coordinate axis (i.e., the x axis in FIG. 2). That is, the linear bearings 14a, 14b provide structural supports which constrain rotation of an electronic device 15 of the assembly 10, which will be discussed further below. Furthermore, the first isolation stage 12 also includes at least one first damper for damping movement of the first frame 13 along the x axis. For example, the first damper may include at least one spring 16. In the illustrated embodiment, only one spring 16 is visible, but a second spring is used to provide biasing in both directions along the x axis, as will be appreciated by those of skill in the art. The springs 16 are coupled between the first frame 13 and a mounting fixture 17, which, in turn, is coupled to the mounting plate 19.

Moreover, the at least one first damper may also include friction surfaces or plates 18a, 18b. The friction plates 18a, 18b may be made of plastic or other suitable materials, for example, and are used to cause friction between the mounting fixture 17 and the first frame 13 when the first frame travels back and forth along the x axis. The friction plates may be mounted on either the first frame 13 or the mounting fixture 17. The springs 16 and friction plates 18a, 18b also reduce the resonant amplification of movement of the first frame 13, as will be appreciated by those of skill in the art.

Similarly, the illustrated vibration tolerant electronic assembly 10 also includes a second isolation stage 20 similar to the first isolation stage 12. That is, the second isolation stage 20 includes a second frame, which in turn includes a second lower subframe 21 and a second upper subframe 31. The second lower subframe 21 includes a pair of parallel spaced apart second linear bearings 22a, 22b coupling the second lower subframe to the first frame 13. The second linear bearings 22a, 22b constrain movement of the second frame along a second coordinate axis (i.e., the y axis in FIG. 2). Again, other numbers of linear bearings may also be used.

Furthermore, the second isolation stage 20 includes at least one second damper for damping movement of the second frame along the y axis, which again may include a pair of springs 23a, 23b and friction plates 24a, 24b. Additionally, isolators or couplers 25, such as grommets or bodies made from an elastomeric material, for example, may optionally be used to couple the first frame 13 and the second lower subframe 21 together and provide additional damping, particularly rotational damping between the two stages.

Thus, when the elastomeric couplers 25 and the second lower subframe 21 are used, the vibration tolerant electronic assembly 10 will be semi-rigid, i.e., a small amount of pivoting will take place between the first frame 13 and second upper subframe 31, which may be advantageous in certain applications. Of course, those of skill in the art will appreciate that other more rigid connectors may be used to substantially eliminate pivoting between the first frame 13 and the second upper subframe 31 to provide a more rigid embodiment of the vibration tolerant electronic assembly 10.

A third isolation stage 30, similar to the first isolation stage 12 and the second isolation stage 20, also includes a third frame. In the illustrated embodiment, the third frame includes a third outer subframe portion 32 and a pair of third inner subframe portions 39a, 39b. The third inner subframes 39a, 39b each carry respective linear bearings 33a, 33b which couple the third inner subframes to the third outer subframe 32 to constrain movement of the third inner subframes along a third coordinate axis (i.e., the z axis in FIG. 2). Further, the third inner subframes 39a, 39b also include at least one third damper which again dampens movement of the third frame 30 along the z axis and may include springs 34a, 34b and friction plates 35a, 35b similar to those described above. Both the second and third frames may be made of similar materials as the first frame 13.

As may best be seen in FIG. 1, the third inner subframes 39a, 39b fit inside the third outer subframe 32 and down over the top and sides of the second upper subframe 31 and first frame 13. This is made possible by the second upper subframe 31 which has dimensions in the x and y directions that are preferably larger than that of the second lower subframe 21. Additionally, opposing ends 36 of the second upper subframe 31 are also formed so that the linear bearings 33a, 33b are positioned adjacent the sides of the second lower subframe 21. Of course, in other embodiments the various isolation stages may be stacked on top of one another or otherwise arranged, if desired, as will be appreciated by those of skill in the art. Once again, elastomeric couplers 38 may be used to couple the second upper subframe 31 to the third outer subframe 32.

Additionally, the vibration tolerant electronic assembly 10 may further include a holder 40 carried by the third inner subframes 39a, 39b and upon which the electronic device 15 is mounted. The present invention is particularly well suited for use with hard disk drives (e.g., magnetic and optical disk drives), such as that illustratively shown in FIG. 2, for example. That is, the enhanced vibration damping resulting from the structure of the present invention allows both reading and writing to be performed on hard disk drives in high stress environments, as will be discussed further in the example given below. Of course, the present invention may be used with numerous other electronic devices where vibration damping is desired.

A cover 41 may be coupled to the holder 40 to not only provide physical protection for the electronic device 15 but also for hermetically sealing the electronic device between the cover and the holder, if desired. The cover 41 and holder 40 may be made of similar materials as the first frame 13. Further, one or more elastomeric couplers 37 may also be included for coupling the holder 40 to the third inner subframes 39a, 39b to provide still further vibration damping. Again, rigid couplers may be used in some embodiments, if desired.

As a result of the above construction, the vibration tolerant electronic assembly 10 is fairly compact and requires little if any additional mounting space than would otherwise be required with prior art isolation systems. Further, the illustrated embodiment also advantageously places all of the elastomeric couplers 25, 37, 38 at about the same height so that the various pivot points associated therewith are substantially in the same plane. This aspect, in addition to the use of multiple dampers in each of the first isolation stage 12, the second isolation stage 20, and the third isolation stage 30 significantly compound vibration dampening. Further, the present invention may be used over a wide operating frequency range of up to about 2000 Hz or higher.

Additionally, by adjusting the properties of the various springs, friction plates, and elastomeric couplers, as well as the rigidity and mass of the frames, for example, respective resonant frequencies of the first isolation stage 12, the second isolation stage 20, and the third isolation stage 30 may advantageously be set to not be equal. Of course, other suitable damping devices known to those of skill in the art may also be used. Preferably, these resonant frequencies are set as far apart as possible. Also, in those embodiments where elastomeric couplers are used to provide pivoting between the various frames, it may also be desirable to space the pivot points out as far as possible, as will be appreciated by those skilled in the art.

EXAMPLE

Figure 3:
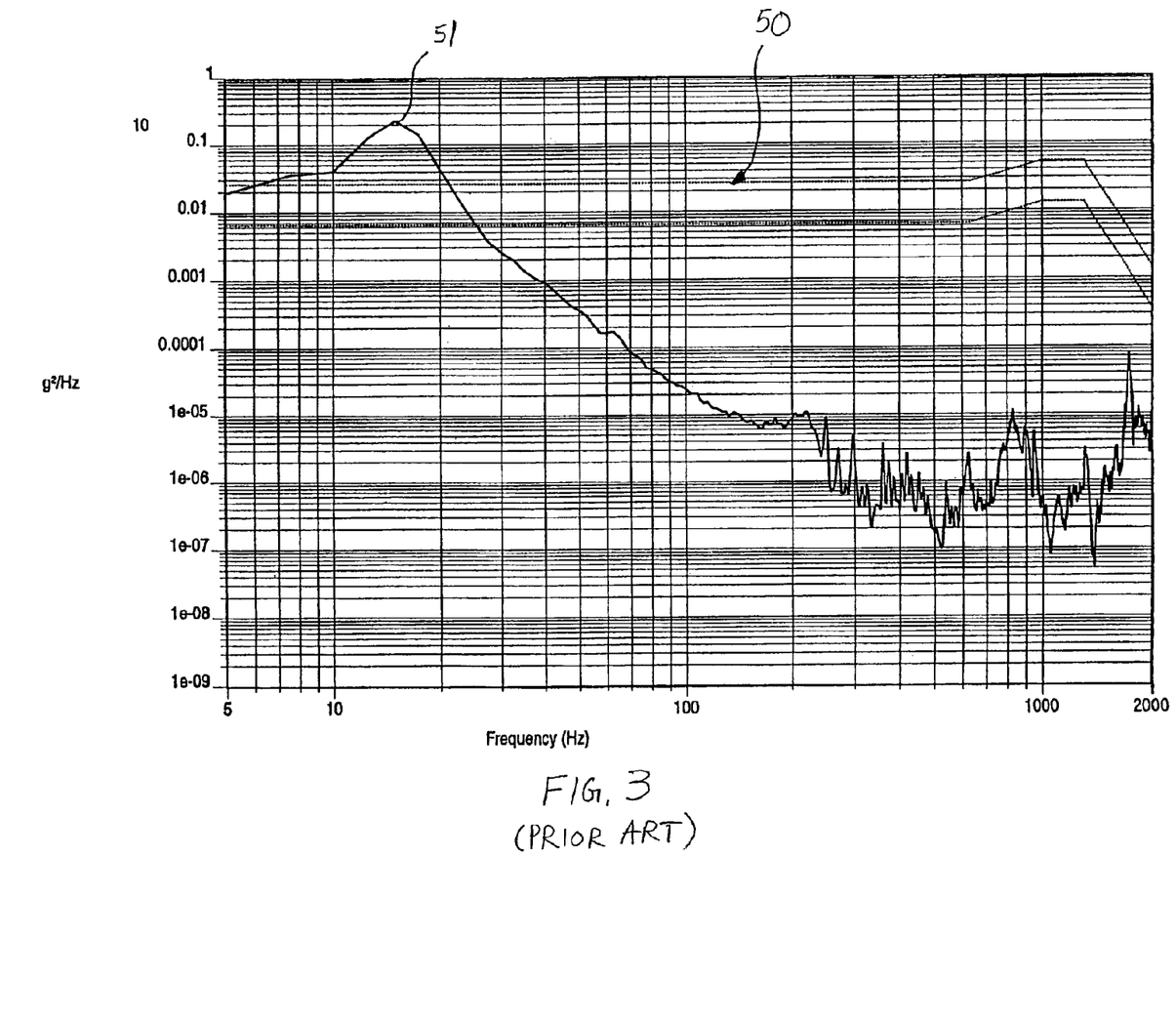
FIG. 3 is a graph illustrating a vibration PSD curve for a disk drive mounted in a prior art vibration isolation assembly.
Figure 4:
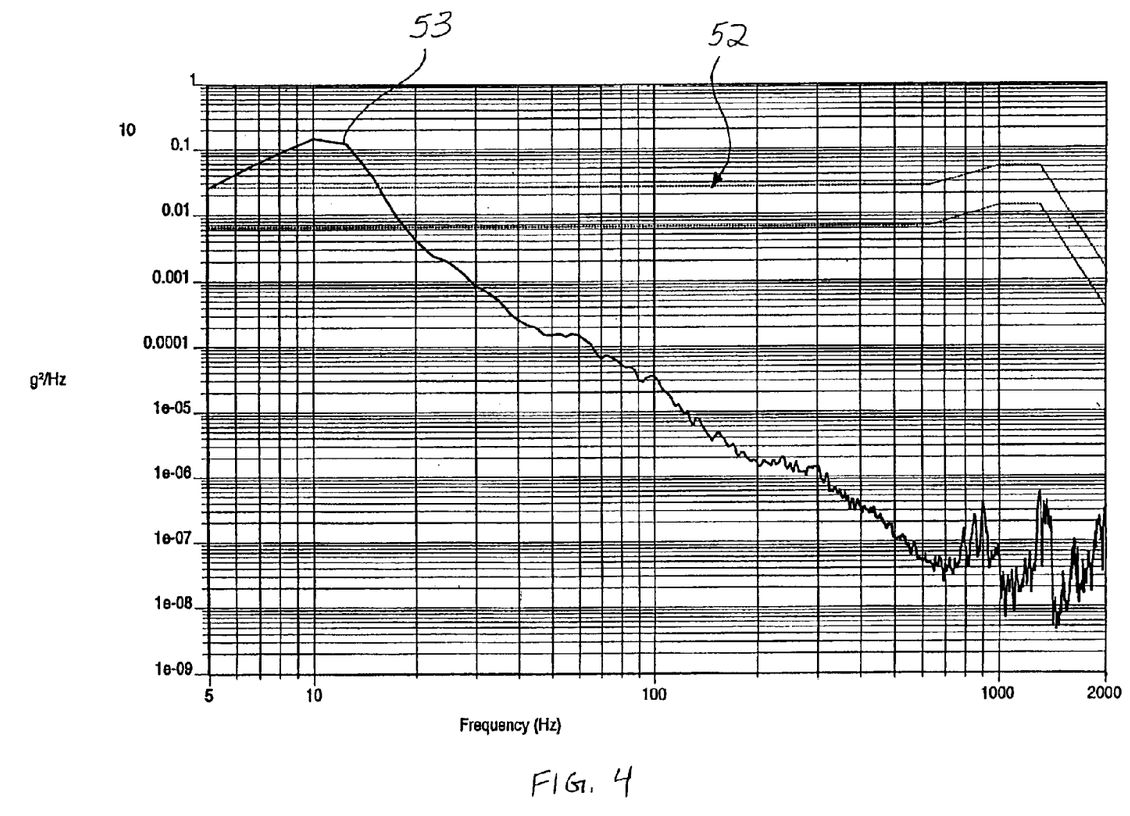
FIG. 4 is a graph illustrating a vibration PSD curve for a disk drive mounted in the vibration tolerant electronic assembly of the present invention.

By way of comparison, FIGS. 3 and 4 are graphs illustrating vibration power spectrum density (PSD) output curves for a magnetic disk drive in a prior art isolation assembly (RMS=1.299 g) and in the vibration tolerant electronic assembly 10 made according to the present invention (RMS=1.007 g), respectively. The prior art assembly tested included a frame, a holder for the magnetic disk drive positioned within the frame, and elastomeric couplers coupling the holder to the frame. A Travelstar model disk drive manufactured by the IBM Corporation was used in both assemblies.

Respective inputs 50, 52 were provided to the disk drives in the prior art assembly and the vibration tolerant electronic assembly 10 according to the present invention, and the G forces experienced by the disk drives are illustrated in the respective vibration PSD output curves 51, 53. As will be appreciated by those of skill in the art upon comparison of the output curves 51, 53, approximately 20 to 30 dB in isolation improvement was achieved according to the present invention.

Another aspect of the invention relates to a vibration reduction system for an electronic device 15. The vibration reduction system includes a base 11 and a first isolation stage 12 including a first frame 13, at least one first linear bearing 14 coupling the first frame to the base 11 to constrain movement of the first frame along a first coordinate axis, and at least one first damper (e.g., the springs 16 and/or friction plates 18a, 18b) for damping movement of the first frame along the first coordinate axis, as previously described above. The vibration reduction system may also include a second isolation stage 20 and a third isolation stage 30, again as previously described above. The electronic device 15 is to be coupled to the third inner subframes 39a, 39b of the third isolation stage 30 via the holder 40, for example.

A method aspect of the invention is for reducing vibration of an electronic device 15 and may include coupling a first frame 13 to a base 11 with at least one first linear bearing 14 to constrain movement of the first frame along a first coordinate axis, as previously described above.

Furthermore, movement of the first frame may be dampened along the first coordinate axis using the springs 16 and/or the friction plates 18a, 18b. The method may further include coupling a second upper subframe 31 of a second frame to the first frame 13 with linear bearings 22a, 22b to constrain movement of the second frame along a second coordinate axis.

Again, damping of movement of the second frame along the second coordinate axis may be performed using the springs 23a, 23b and/or the friction plates 24a, 24b. Furthermore, third inner subframes 39a, 39b of a third frame may be coupled to the second upper subframe 31 with third linear bearings 33a, 33b to constrain movement of the third frame along a third coordinate axis, and movement of the third inner subframes 39a, 39b may be dampened along the third axis by the springs 34a, 34b and friction plates 35a, 35b. Additionally, the electronic device 15 may be coupled to the third inner subframes 39a, 39b via the holder 40. The remaining aspects of the method may be as previously described above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A vibration reduction system for an electronic device and comprising:
    a plurality of isolation stages coupled to one another;
    at least one isolation stage comprising a frame and at least one linear bearing coupling said at least one isolation stage to an adjacent isolation stage to constrain movement of said frame along a coordinate axis, and at least one elastic damper for damping reciprocal movement of said frame along the coordinate axis;
    a holder carried by said frame upon which said electronic device is mounted; and
    a cover coupled to said holder for hermetically sealing said electronic device.

2. The vibration reduction system of claim 1 wherein said at least one isolation stage comprises three isolation stages.

3. The vibration reduction system of claim 1 wherein said at least one elastic damper comprises at least one spring.

4. The vibration reduction system of claim 1 wherein said at least one isolation stage further comprises at least one friction surface also for damping movement of said frame along the coordinate axis.

5. The vibration reduction system of claim 1 further comprising at least one elastomeric coupler coupling said frame of said at least one isolation stage to an adjacent isolation stage.

6. The vibration reduction system of claim 1 wherein said plurality of isolation stages have different resonant frequencies.

7. The vibration reduction system of claim 1 wherein said at least one linear bearing comprises a pair of parallel spaced apart linear bearings.

8. A method for reducing vibration of an electronic device comprising:
    coupling a plurality of isolation stages to one another, at least one isolation stage comprising a frame and at least one linear bearing for coupling the at least one isolation stage to an adjacent isolation stage and constraining movement of the frame along a coordinate axis;
    coupling a holder to the frame;
    mounting the electronic device on the holder;
    coupling a cover to the holder to hermetically seal the electronic device; and
    damping reciprocal movement of the frame along the coordinate axis using at least one elastic damper.

9. The method of claim 8 wherein the at least one isolation stage comprises three isolation stages.

10. The method of claim 8 wherein the at least one elastic damper comprises at least one spring.

11. The method of claim 8 further comprising coupling the frame of the at least one isolation stage to an adjacent isolation stage using at least one elastomeric coupler.

12. The method of claim 8 wherein the plurality of isolation stages have different resonant frequencies.

13. The method of claim 8 wherein the at least one linear bearing comprises a pair of parallel spaced apart linear bearings.

14. The method of claim 8 further comprising damping movement of the frame along the coordinate axis using at least one friction surface.

* * * * *

UNITED STATES PATENT AND TRADEMARK OFFICE
CERTIFICATE OF CORRECTION

PATENT NO. : 6,909,599 B2
DATED : June 21, 2005
INVENTOR(S) : Ying-Ming Lee et al.

It is certified that error appears in the above-identified patent and that said Letters Patent is hereby corrected as shown below:

The title page should be deleted and substitute the attached title page.

Delete drawing sheets 1-4, and substitute the drawing sheets, consisting of Figs. 1-4 as shown on the attached pages.

Signed and Sealed this

Twenty-first Day of March, 2006

JON W. DUDAS
*Director of the United States Patent and Trademark Office*

(12) United States Patent  (10) Patent No.: US 6,909,599 B2
Lee et al.  (45) Date of Patent: *Jun. 21, 2005

(54) VIBRATION TOLERANT ELECTRONIC ASSEMBLY AND RELATED METHODS (75) Inventors: Ying-Ming Lee, Melbourne, FL (US); Frank Daneshgar, Satellite Beach, FL (US)

(73) Assignee: Harris Corporation, Melbourne, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/609,968

(22) Filed: Jun. 30, 2003

(65) Prior Publication Data

US 2004/0090741 A1 May 13, 2004

Related U.S. Application Data (63) Continuation of application No. 09/949,289, filed on Sep. 7, 2001, now Pat. No. 6,621,694.

(51) Int. Cl.⁷ .................................................. G06F 1/16
(52) U.S. Cl. ........................ 361/685; 361/679; 361/683
(58) Field of Search ............................ 361/679, 683–686

(56) References Cited

U.S. PATENT DOCUMENTS

| | | | |
|---|---|---|---|
| 4,351,556 A | 9/1982 | Worringer | 296/63 |
| 4,749,164 A | 6/1988 | Leo et al. | 248/674 |
| 4,893,210 A | 1/1990 | Mintzlaff | 360/137 |
| 4,908,715 A | 3/1990 | Krum et al. | 360/97.02 |
| 5,035,396 A | 7/1991 | Krum et al. | 248/635 |
| 5,463,527 A | 10/1995 | Hager et al. | 361/685 |
| 5,602,717 A | 2/1997 | Leshem et al. | 361/685 |
| 5,982,573 A | 11/1999 | Henze | 360/75 |
| 6,097,608 A | 8/2000 | Berberich et al. | 361/752 |
| 6,220,563 B1 | 4/2001 | Cunningham | 248/580 |
| 6,445,587 B1 | 9/2002 | Pavol | 361/727 |
| 6,477,042 B1 | 11/2002 | Allgeyer et al. | 361/685 |

*Primary Examiner*—Yean-Hsi Chang
(74) *Attorney, Agent, or Firm*—Allen, Dyer, Doppelt, Milbrath & Gilchrist, P.A.

(57) ABSTRACT

A vibration tolerant electronic assembly may include a base and a first isolation stage including a first frame, at least one first linear bearing coupling the first frame to the base to constrain movement of the first frame along a first coordinate axis, and at least one first damper for damping movement of the first frame. A second similar isolation stage may be coupled to the first isolation stage, and a third similar isolation stage may be coupled to the second isolation stage. Furthermore, an electronic device may be coupled to the third isolation stage. The electronic assembly provides resistance to disturbance of the electronic device by vibration in one or more of three coordinate axis.

14 Claims, 4 Drawing Sheets